United States Patent [19]

Alexander

[11] Patent Number: 5,303,443
[45] Date of Patent: Apr. 19, 1994

[54] DOCK LEVELER HOLD-DOWN SYSTEM

[75] Inventor: James C. Alexander, London, Canada

[73] Assignee: The Serco Corporation, London, Canada

[21] Appl. No.: 862,440

[22] Filed: Apr. 2, 1992

[51] Int. Cl.$^5$ ............................................ B65G 69/24
[52] U.S. Cl. .................................... 14/71.1; 14/71.3
[58] Field of Search .............. 14/69.5, 71.1, 71.3, 14/71.7; 188/67, 381; 114/362

[56] References Cited

U.S. PATENT DOCUMENTS

| | | | |
|---|---|---|---|
| 1,114,832 | 10/1914 | Whitney | 188/67 X |
| 2,974,336 | 3/1961 | Kelley | 14/71.3 |
| 3,117,332 | 1/1964 | Kelley et al. | 14/71.3 |
| 3,137,017 | 6/1964 | Pfleger et al. | 14/71.3 |
| 3,475,778 | 11/1969 | Merrick et al. | 14/71.3 |
| 3,646,627 | 3/1972 | Potter | 14/71.3 |
| 3,699,601 | 10/1972 | Hecker, Jr. et al. | 14/71.3 |
| 4,126,909 | 11/1978 | Smith et al. | 14/71.3 |
| 4,847,935 | 7/1989 | Alexander et al. | 14/71.3 |

Primary Examiner—Ramon S. Britts
Assistant Examiner—James A. Lisehora
Attorney, Agent, or Firm—Sughrue, Mion, Zinn, Macpeak & Seas

[57] ABSTRACT

A hold down device for a dock leveler employs a pair of telescoping members sliding with respect to each other. One member is coupled to the deck and the other to the leveler frame. A resilient member biases the telescoping members toward each other but provides for a degree of float in the system. A brake shoe has a ramp surface and is biased against one of the members as they separate. A release lever moves the brake shoe for disengagement as the leveler is lowered. Thereafter the brake shoe engages and movement is via the resilient member. If the leveler moves down such that the resilient member is compressed, as the telescoping members compress they cause the release member to move thereby slipping the brake. This in turn allows the telescoping members to reset and re-engage the brake.

20 Claims, 4 Drawing Sheets

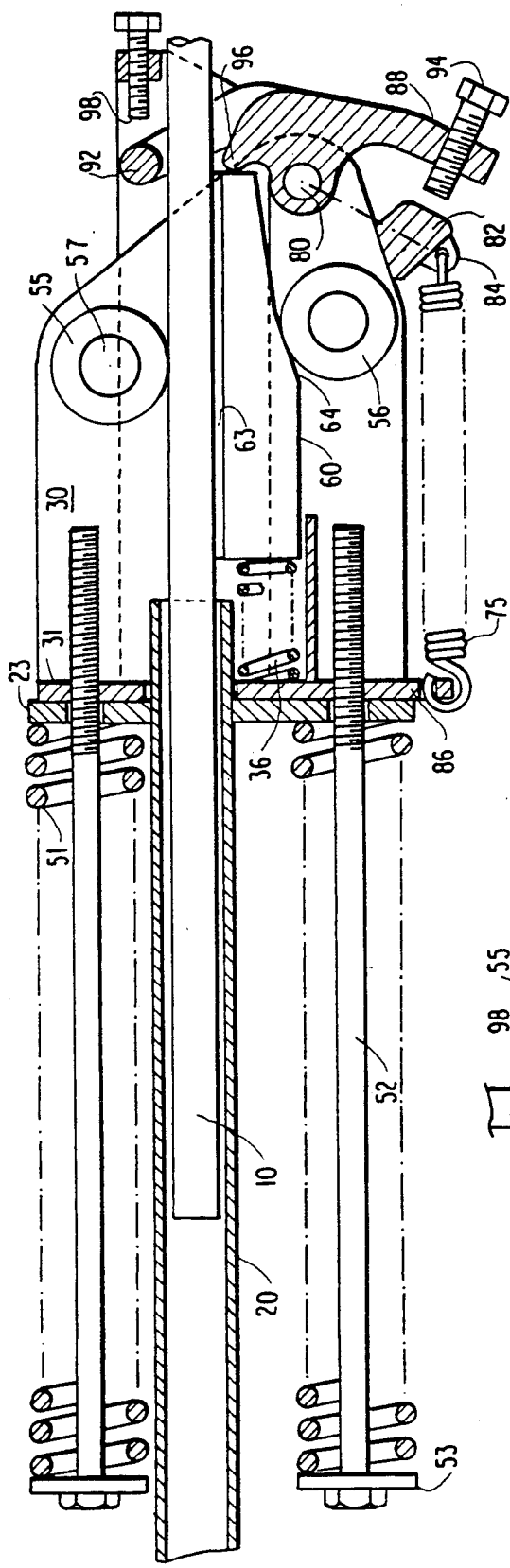
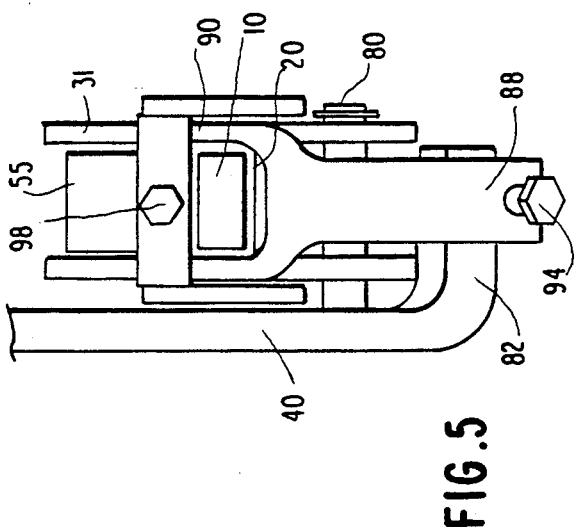
FIG. 4
FIG. 5

DOCK LEVELER HOLD-DOWN SYSTEM

BACKGROUND OF THE INVENTION

This invention is related to a hold-down system for use with a mechanically operated dock leveler. Dock levelers or, dock boards, have a ramp which is hingedly mounted at its rear edge to a loading dock or to supporting structure set forth in a pit. The front edge of the ramp has an extension lip which is hinged so that it rests on the bed of a carrier, such as a truck which is loaded and/or unloaded at the dock. The dock board is a bridge between the carrier and the dock. The art is replete with a myriad of different configurations of such dock levelers with various types of actuating mechanisms, safe legs or the like.

This invention is directed to a technique of holding down the dock leveler in a particular position yet allowing the device to "float" as the truck is loaded and unloaded and so that the truck bed assumes a different vertical height.

The deck assembly of a mechanically operated dock leveler is spring loaded so that when the hold-down device is released the deck will tend to raise under the spring bias. As the deck goes up a mechanism automatically extends the lip from a downward pendant position to an outwardly extending one. With the deck thus raised, that is pivoted upward, an operator then walks the unit down by walking onto the deck using his weight to lower the deck until the lip comes to rest on the truck bed. The hold-down device maintains the deck at an operative position with the lip in contact with the truck bed. Most mechanical dock leveler hold-down devices employ a ratchet and pawl mechanism to hold the dock leveler from rising once placed in an operative position together with a float spring to allow the leveler to follow the height of the truck as it moves up and down with varying loads.

An example of a rack and gear mechanism is illustrated in U.S. Pat. No. 4,847,935 which utilizes a brake band as a technique of stabilizing the unit in position. Such a configuration is an advance over the conventional ratchet and pawl design which has only a limited travel with the float spring and stores high forces making the pawl difficult to release.

Another technique is the use of a friction brake to allow unlimited float. An over-running clutch allows the hold-down to retract and the brake slips as the hold-down is forced to extend. The brake is easy to release, but without a float spring the brake slips every time the leveler moves upward. An example of such a frictional brake is illustrated in U.S. Pat. No. 4,126,909. A slightly different mechanism which employs a spring in series with the brake is illustrated in U.S. Pat. No. 3,137,017.

In such systems the brake is easy to release but without a full length float spring there is slippage every time the leveler moves upward. Since the truck height and therefore that of the dock leveler varies each time a heavily loaded vehicle such as a fork lift travels over it there will be repeated brake slip resulting in excessive wear of the mating surfaces.

Additionally, most existing friction brake hold-down devices are complex requiring a brake and drum, over-running clutches, cables and reels, or a rack and pinion. Given that dock levelers operate in a harsh environment subject to extremes of weather and debris it is important that these devices be as simple and reliable in their operation.

Yet another problem with traditional hold-down devices without float control is that the dock-leveler will not fall back down to contact a trailer bed after it has risen and then return to its previous height. This sequence occurs when a heavy fork truck is driven into a trailer which has a soft suspension and is nearly empty. As the fork lift truck enters the trailer, the leveler and the back of the trailer are depressed based on the weight which is applied. As the fork lift truck then moves forward on the truck base to the front of the trailer the load on the rear suspension is decreased and the rear of the trailer tends to rise. This in turn forces the dock leveler to rise and the hold-down mechanism to extend.

When the fork truck then attempts to reverse its position and back out of the trailer the weight of the fork lift again depresses the rear of the trailer. However, the dock leveler has no float associated with it and thus tends to remain at the previous height. The extended lip tends to fall to meet the trailer bed. The fork lift truck is then presented with a very high angled ramp in which it must climb. If the height difference is too great the angle is steep and the fork lift truck will strike the folded lip damaging the fork lift truck or leveler or, in a worst case condition causing potential injury to the driver.

Thus, there exists within this technology a need for a hold-down device that provides for an increased degree of float as the vehicle is loaded and/unloaded yet at the same time provides a simplification in the reduction of elements such as the elimination of ratchets, pawls, unnecessary cables and reels. Moreover, in the context of devices which use brake mechanisms, a minimization of wear of the operational elements as a consequence of brake slippage is highly desirable.

SUMMARY OF THE INVENTION

Given the deficiencies in the prior art it is a primary object of this invention to provide an improved hold-down for dock levelers that provides the combined action of an axial friction brake with a float spring to provide unlimited float for the unit.

Yet another object of this invention is to provide a hold-down for dock levelers whereby the amount of brake slippage is minimized thereby reducing the wear of the brake elements.

A further object of this invention is to provide a hold-down for dock levelers that is simplified in configuration eliminating unnecessary gears, ratchets, pawls, cables and reels, and other complex assemblies.

In accordance with the first embodiment of this invention, the hold-down device employs a pair of telescopic members which are slidable relative to each other. A brake shoe releasably engages one of the members. One of the members is attached to the deck of the leveler and the other to the frame. Mechanically interposed is a bias spring system which allows the members to move relative to each other as the ramp moves up and down, that is, during float. The telescoping brake assembly members are biased into contact with each other via a resilient member for the brake shoe while at the same time the float spring urges the telescopic members in a direction opposite to that of the float spring. A brake lever is used to release the brake shoe and permit the unit to reset.

That is, with the brake lever released the dock leveler is allowed to raise and the members telescope outward without any brake. After the brake lever is released, the leveler is walked down and the telescoping assembly is compressed having to overcome only the biasing force on the spring used to hold the brake shoe in place. The brake shoe engages to lock the leveler. The brake mechanism thus prevents the unit from upward movement. The greater the force exerted to withdraw the bar mechanism the more tightly the brake shoe will be wedged against the bar to prevent slippage.

If the force exerted on the bar is greater than the compression force of the float springs then, the bar assembly tends to move away from its concentric tube and allows the deck to float without any slippage of the brake. That is, the brake remains frictionally attached to the bar but the housings tend to move apart. When the maximum extent of float is achieved the brake mechanism is automatically released to allow the springs to retract and thus urge the housings back into engagement. A new continued float position is therefore provided at that new equilibrium position.

This invention will be described in greater detail by referring to the attached drawing and the description of the preferred embodiment that follows.

BRIEF DESCRIPTION OF THE DRAWING

FIG. 4 is a schematic side view of a second preferred embodiment in accordance with this invention; and FIG. 5 is an end view of the second preferred embodiment illustrating the lever release mechanism.

DESCRIPTION OF THE PREFERRED EMBODIMENTS

Figure 1:
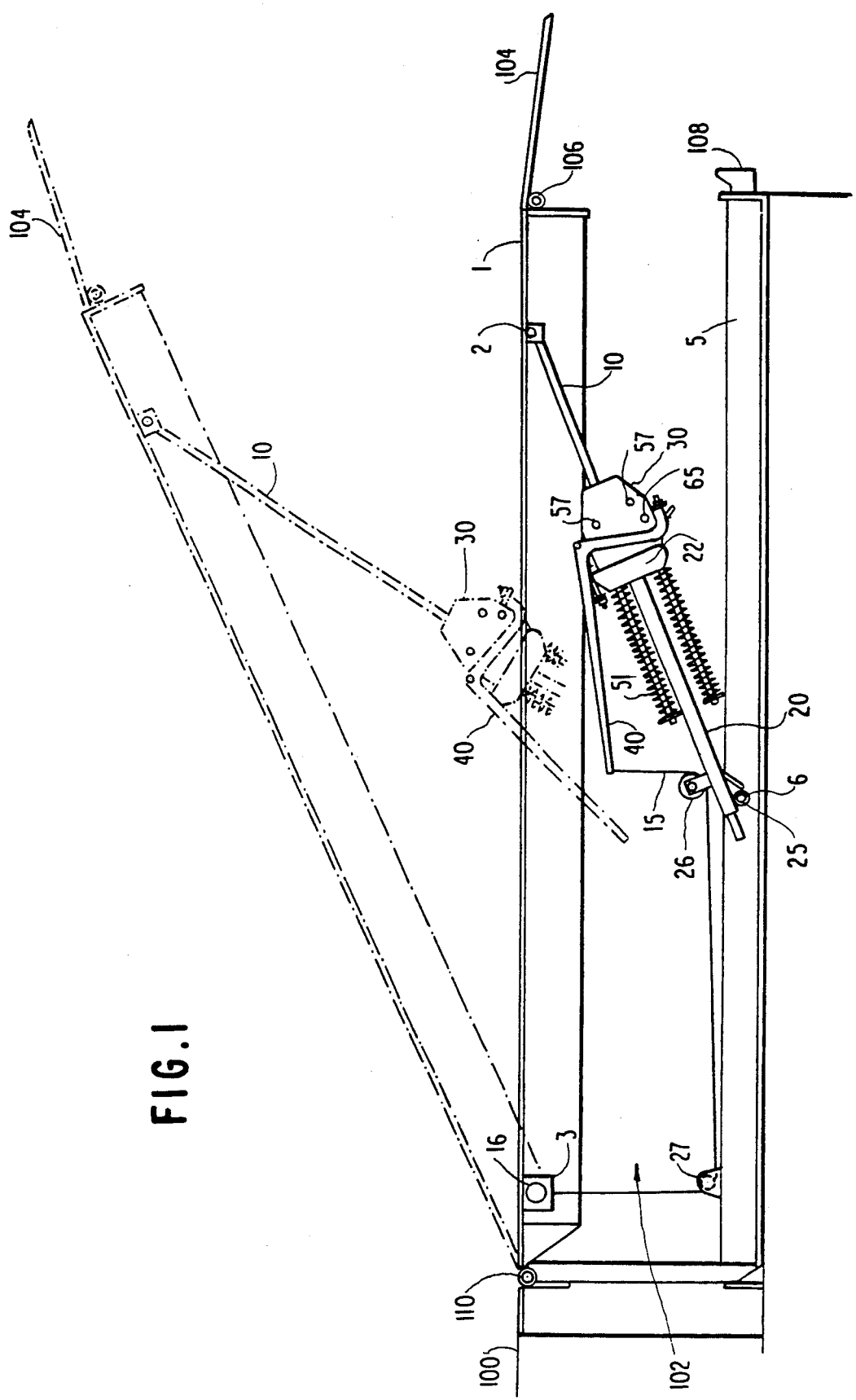
FIG. 1 is a schematic side view illustrating the dock leveler hold-down of a first embodiment of this invention with the deck in two positions.
Figure 2:
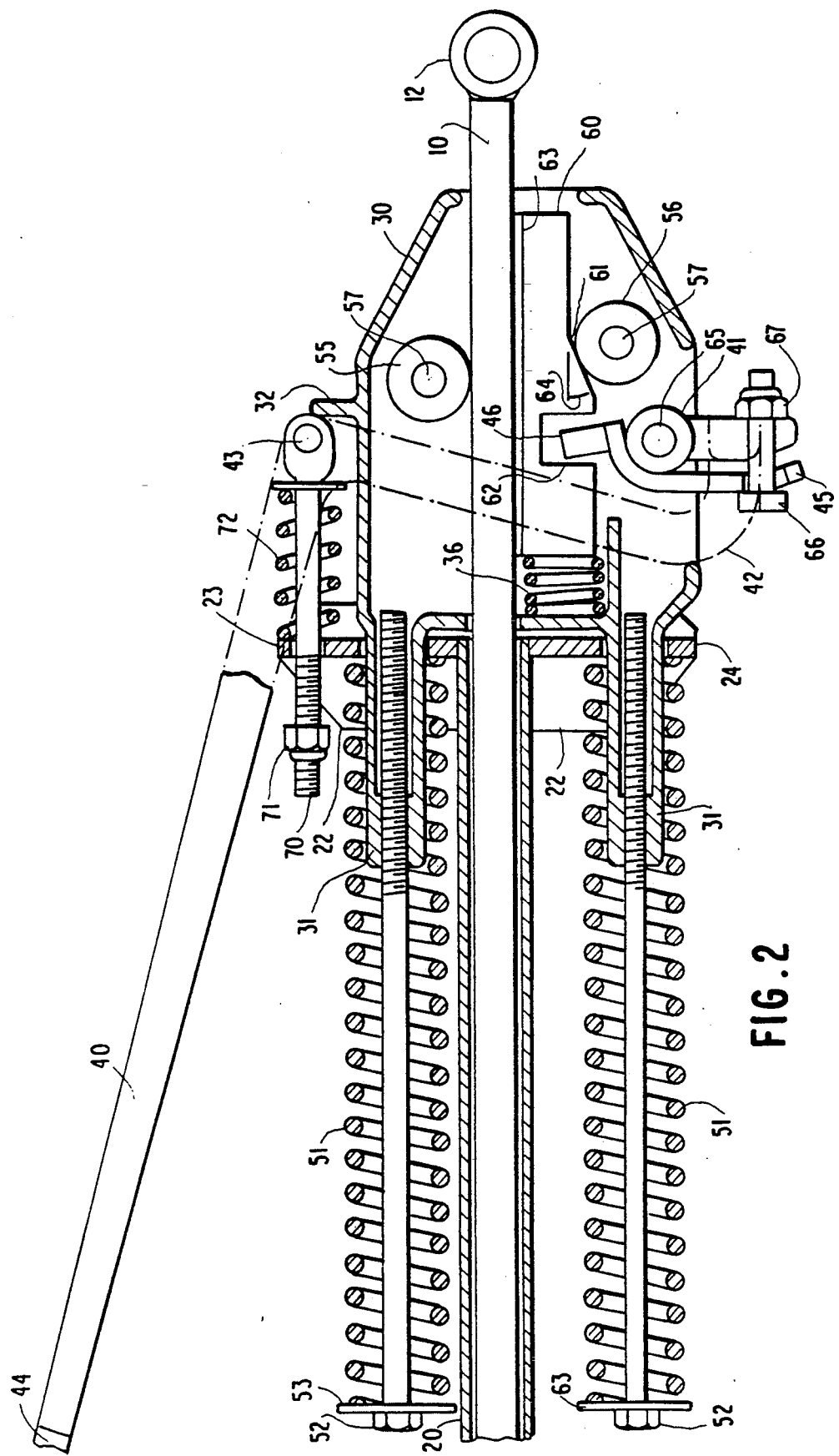
FIG. 2 is a cut-away side view of the hold-down mechanism illustrated in FIG. 1.
Figure 3:
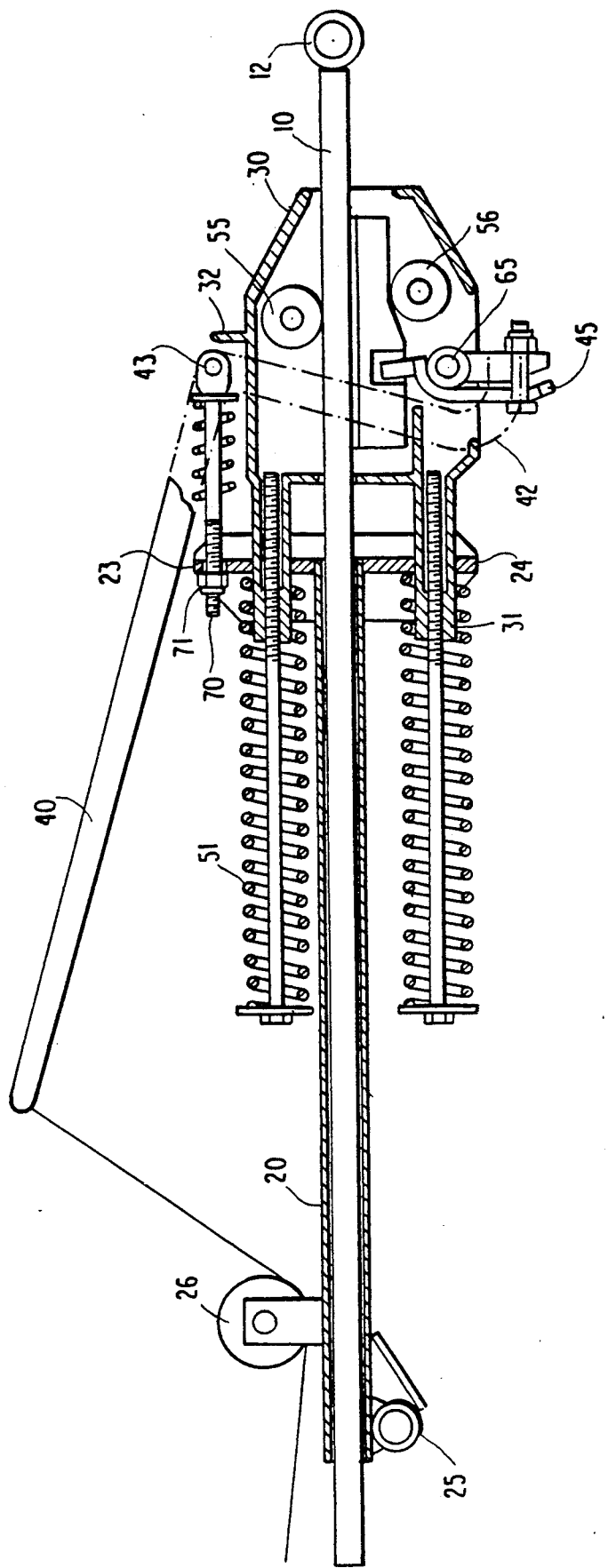
FIG. 3 is a cut-away side view of the hold-down mechanism of FIG. 1 illustrating movement of the assembly during a float condition.

Referring now to FIGS. 1, 2 and 3 a first preferred embodiment of this invention is depicted. The basic elements of a dock leveler are illustrated and will be identified only to place this invention in proper perspective. It is recognized that there are other components which are not illustrated in FIG. 1 but which will be well known to those working in the technology.

A dock leveler is generally relative to a flush dock surface 100 in a shallow pit or recess 102; thus, when the deck assembly 1 is in the horizontal position as illustrated by the solid line in FIG. 1 a so called cross-traffic mode is established where vehicles can ride across the dock leveler on the same level as the dock surface 100. Such levelers are conventionally pit mounted utilizing a frame assembly 5. An extensible lip 104 is hingedly mounted onto the end of the deck by means of a hinge pin 106. In the illustrated embodiment the lip 104 is extended. When the dock is stored however the lip is customarily retained by lip keepers 108, which extend from the frame 5. The entire deck 1 is pivoted about a pin 110 mounted to the frame assembly.

The hold-down mechanism comprises a pair of telescopic members 10 and 20 together with a housing 30. As illustrated in FIG. 3, rod member 10 telescopes inside tube member 20. A release lever 40 is positioned on the side of the housing 30 and is operably coupled to the interior components via hole in the housing (see FIG. 3).

The bar assembly 10 is attached to the deck assembly 1 by means of a pin 2. The other telescoping member, the tube assembly 20 is attached to the pit frame 5 by means of a pin 6. A release cable 15 is attached to one end of the release lever 40. It passes around a pair of pulleys 26 and 27. Pulley 26 is attached to tube assembly 20 while pulley 27 is anchored to the frame 5. The other end of the release cable 15 has attached thereto a release handle 16. The handle 16 is supported in a recessed cup 3 in the deck assembly 1.

Referring now to FIG. 2, the detailed construction of the internal components of the hold-down mechanism is depicted. The bar assembly 10 comprises a bar coupled to a mounting boss 12. The tube assembly 20 comprises the concentric tube holding the inner telescoping member 10 and two side plates 22. Two attaching flanges 23 and 24 are attached to the side plates 22. A mounting boss 25 (see FIG. 3) is used to couple the bar assembly 20 to the frame 5 via the pin 6. Thus, as illustrated in FIG. 2 the bar 10 telescopes inside the tube 20.

Housing 30 has an internal cavity with openings at both ends to allow the bar and tube to pass there through. An opening in the bottom of the housing 30 permits the assembly of internal components and the mounting of the release arm 40.

As illustrated in FIG. 2, two mounting bosses 31 fit through holes in the lugs 23 and 24. A pair of springs 51 fit over the bosses 31 and are retained by a pair of bolts 52 which are in turn threaded into the bosses 31 which are internally threaded. End plates 53 constrain the springs onto the bolts 52. The other end of the springs 51 bears against the attaching flanges 23 and 24. As the bolts 52 are tightened the springs 51 compress and the brake housing 30 is held in contact with the end of the side plates 22 of the tube assembly. This is best illustrated in FIG. 2. By compression of the springs 51 the rod 10, the housing 30 and tube 20 are biased into compression with each other.

Within the brake housing 30 a pair of rollers 55 and 56 are respectively carried by shafts 57 inserted in holes in the sides of the housing 30. The brake shoe assembly comprises a brake shoe 60 having a hole 62 and a friction pad 63. The shoe 60 has an angled surface 61 which rests on a roller 56. Roller 56 is journalled for rotation on the shaft 57. That is, surface 61 forms a ramp or cam surface for the roller 56. The friction pad 63 contacts a lower surface of the bar assembly 10. As the bar moves within the housing frictional contact exists between the pad 63 and the bar 10 as a function of the position of cam surface 61 relative to roller 56.

A spring 36 at the end of the brake shape assembly exerts a force to bias the shoe 60 into contact with the roller 56 and thus bar assembly 10 by moving the shoe upward. That is, as illustrated in FIG. 2 the spring 36 biases the brake shoe 60 to the right such that cam surface 61 bears on roller 56 causing upward movement in the direction of the bar 10.

When the deck is urged downward this motion tends to move (compress) the bar assembly further into the tube 20. The only force to be overcome is that of the spring bias 36. This is because as the bar 10 moves to the left the frictional pad 63 will tend to move with it but the cam surface 61 will cause the frictional pad to disengage. Thus, the only force resisting downward movement of the deck is that of the spring 36.

Conversely, when a force is exerted to withdraw the bar assembly, that is, with the deck 5 being raised, the shoe assembly is drawn to the right by friction against the bar assembly and is caused to wedge between the bar and the lower roller 56. The greater the force exerted to withdraw the bar 10 the more tightly the brake shoe 60 is wedged against the bar so that it cannot slip. To insure that the brake is self-energized the tangent of the angle 64 defining the inclined ramp surface 61 of the brake shoe must be less than the coefficient of friction between the bar assembly 10 and the brake pad 63.

A release lever 40 fits partially within the bottom of the cavity in the housing 30. As illustrated in FIG. 2, the lever 40 comprises a pivot boss 41, a contoured arm 42, a pin 43 protruding from the midpoint of the arm and a pin 44 at the end of the arm. The release lever itself is mounted on a shaft 65 which is inserted into a hole at the side of the housing.

FIG. 2 illustrates a secondary release lever 45 which rests on top of the pivot boss 41. Secondary release lever 45 is secured to the release lever 40 by means of a bolt 66 and a nut 67. The bolt 66 and nut 67 permit adjustment of the relative positions of the release lever 40 and the secondary release lever 45. This is done to compensate for manufacturing tolerances and wear of the friction brake 63. Tightening of the bolt 66 has the effect of changing the position of the secondary release lever 44 which carries with it a lug 46.

During normal operation the bolt 66 and nut 67 are adjusted so that the lug 46 is loose in the hole 62. This is illustrated in FIG. 2. However, when the release lever 40 is rotated by pulling of the cable 15, the lug 46 is urged against the side of the hole 62 in the brake shoe 60. This tends to urge the brake shoe 60 to the left such that when the frictional force of the brake shoe assembly is overcome the brake slips and moves away from the lower roller 56. That is, the lug 46 tends to move the brake shoe 60 to the left thereby disengaging from the roller 56. This in turn reduces the wedge force on the cam surface 61 and in turn allows the bar assembly 10 to be withdrawn.

An eye bolt 70 fits over the pin 43. It passes through a hole in the flange 23 of the tube assembly 20. A spring 72 is positioned between the flange 23 and is biased against the arm 42. This forces the bolt against a stop tab 32 on the housing 30. By this action, release lever 40 is held forward in the normal operating position. That is, spring 72 tends to bias the release lever 40 such that the lug 46 is disengaged from the brake shoe 60.

In operation, the wedging of the brake shoe assembly 60 prevents the bar 10 from slipping due to any extension force exerted on the bar assembly. If the force exerted is greater than the compressed load of the springs 51 the springs will compress and the brake assembly will be caused to move with the bar away from the tube assembly 20. This separation is illustrated in FIG. 3. As can be seen in that figure, the threaded bosses 31 have moved in the holes on the plates 23 and 24 to separate the housing 30 from those plates 23, 24. This in turn allows the deck to float without any slippage of the brake.

If the load on the bar is reduced springs 51 return the brake assembly housing 30 into contact with the tube assembly 20. That is, the position illustrated in FIG. 2 is therefore assumed. If the load is increased so that the housings separate until the nut 71 on bolt 70 contacts the flange 23, as illustrated in FIG. 3, the eye bolt will pull against the pin 43 of the release lever 40. This action causes the release lever to rotate and the brake in turn to release. That in turn allows the springs 51 to retract the housing 30 back together with the tube assembly 20 and bar compressed. The brake then reengages. As is apparent, the force required to slip the brake is limited by the compression force exhibited by the springs 51.

Consequently, the maximum hold-down force can be adjusted by tightening or loosening the bolts 52. The deflection of the springs 51 allows a limited amount of float without any wear on the brake pad 63. The self releasing feature in turn allows unlimited float if such is required.

It is apparent that modifications of this invention are within its scope. For example, the release lever in the preferred embodiment moves the brake shoe 60 by engagement in a recess in that member. It is also possible to move that member by having a lever contact an end of the shoe to move it in a direction against the bias of the spring.

FIGS. 4 and 5 depict a second preferred embodiment of this invention. It will be understood that the numerals used in these figures correspond to those for the first preferred embodiment where the structural element is the same. The release lever assembly 40 comprises the lever arm having a shaft 80 protruding from one side thereof and a bent portion 82 having an eye 84. A spring 75 is coupled between the eye 84 and an opening 86 of the boss element 31. The spring 75 holds the bar 82 of the release lever in contact with the bottom of the side of the housing plate 30. Carried on the shaft 80 is an adjusting lever 88 which, as illustrated in FIG. 5, has a forked portion comprising two elements 90. The forked portions 90 carry a cross bar 92, as illustrated in FIG. 4. An adjusting bolt 94 passes through a threaded hole in the adjusting lever 88.

When the release lever 40 is rotated a surface 96 at the end of the adjusting lever 88 is urged into contact against the end of the brake shoe assembly 60 counteracting the wedging force of the rollers 55 and 56.

In operation, as the deck assembly 1 is urged upward by the counter balance springs (not illustrated) a force is exerted on the bar assembly 10, 20. The spring 36 holds the shoe assembly so that it wedges itself between the roller 56 and the bar 10. As in the case of the first embodiment, the brake must be self energizing so that as the bar assembly is pulled, the brake shoe wedges tighter and does not slip. The tangent of the angle of the sloped surface 64 is thus, in this embodiment, also greater than the coefficient of friction between the bar 10 and the friction pad 63.

It will be understood that as the deck assembly is raised the release ring 16 has been pulled so that the release lever 40 is rotated. The bar 82 bears against the adjusting bolt 94 which in turn rotates the lever 88 so that the surface 96 bears against the end of the brake shoe assembly 60. This forces the brake shoe assembly away from the roller 56. With pressure thus removed from the brake lining 63 the bar assembly 10 is free to withdraw. The function of the adjusting bolt 94 is to compensate for variations in the position of the brake shoe due to either manufacturing tolerance or wear of the brake lining.

Float in the system in this embodiment occurs when the brake is not released and the deck is raised by a trailer that is being unloaded. That is, as the vehicle is unloaded it will tend to raise and thus cause the deck to follow in a corresponding movement. By applying a force to the bar 10 as the deck tends to raise, the brake shoe assembly 60 is wedged more firmly between itself and the roller 56. This occurs as a function of the cam surface 64. However, when the force of the bar 10 exceeds the compression load on the springs 51, the entire brake assembly is caused to move with the bar away from the tube assembly 20. This allows the deck to float without any slippage of the brake.

When the load on the bar is decreased the springs 51 will return to the position on the housing assembly to establish contact between the two portions, that is, almost 23 and 24 on the tube side and the boss fitting 31 on the bar side. If the load further increases the springs will compress and allow the brake assembly to move until the bolt 98 contacts the cross bar 92. Any further travel will cause the lever 88 to rotate thereby forcing the surface 96 against the end of the brake shoe assembly 60 and decreasing the pressure on the brake shoe. This allows the bar 10 to slip.

The force necessary to slip the brake is thus determined by the compressioned force of the springs 51 which can be adjusted by tightening or loosening the bolts 52. As is apparent then, the adjusting bolt 98 is used to determine the amount of spring float which is permitted before the brake releases.

While two preferred embodiments of this invention have been depicted it is apparent that still other modifications can be made. For example, the brake shoe element can be annular or conform to two or more surfaces of the bar 10. While wedging action is depicted in the two embodiments as relative to a roller within the housing, it is apparent that the same can be accomplished by having the brake shoe assembly move relative to tapered fixed elements thus, in place of the roller 56 a wedge plate or series of wedge plates which are fixed in position can be utilized.

Having described my invention, I claim:

1. A dock leveler comprising:
   a deck pivotedly connected to a stationary frame member to raise and lower with respect to said frame member,
   a hold-down member coupled at one end to said deck and at the other end to a fixed member, said hold-down member comprising a pair elements telescoping relative to each other, spring means to bias said pair of elements into compression, a brake shoe movable relative to one of said pair of elements, means to bias said brake shoe into engagement with one of said pair of elements and release means to urge said brake shoe away from said one of said pair of elements.

2. The dock leveler of claim 1 wherein said brake shoe comprises a tapered surface and said means to bias said brake shoe into engagement comprises a mounting for said brake shoe, a roller mounted for rotation relative to said mounting, and spring means mounted on said mounting to urge said tapered surface against said roller.

3. The dock leveler of claim 1 further comprising a housing for said brake shoe, and wherein said release means comprises a lever mounted to said housing for rotational motion and means moveable by said lever to move said brake shoe whereby said brake shoe disengages from contact with said one of said pair of elements.

4. The dock leveler of claim 3 wherein said brake shoe has a recess therein, a pin engaging a wall forming said recess and means coupling said pin to said lever, whereby motion of said lever causes said pin to engage said wall and move said brake shoe.

5. The dock leveler of claim 3 further comprising an adjusting bolt mounted to said lever and operably engaging said housing to automatically release said brake shoe when said pair of elements separate further than a predetermined distance.

6. The dock leveler of claim 2 wherein said release means comprises a lever coupled to said mounting for pivotal movement, an actuating element responsive to movement of said lever to contact an end of said brake shoe and urge it against said spring means.

7. The dock leveler of claim 1 wherein said pair of elements comprise a rod and tube assembly, a flange coupled to said tube, a housing for said rod and having a boss protruding through said flange, said spring means mounted on said boss and bearing against said flange whereby said flange and said housing are biased into engagement with each other.

8. The dock leveler, of claim 7 wherein said release means comprises a lever mounted to said housing, an opening in said housing and means extending in said opening and responsive to movement of said lever to disengage said brake shoe from said rod.

9. The dock leveler of claim 8 further comprising an adjustment screw mounted to said lever and said flange and contacting said housing to urge said lever to disengage said brake shoe when said housing and said flange have separated a predetermined distance.

10. The dock leveler of claim 7 further comprising a roller mounted in said housing to position said rod relative to said brake shoe.

11. A dock leveler comprising:
    a frame fixedly mounted at a loading dock in a pit cut into said loading dock, said frame having a bottom member and a rear member,
    a deck pivotedly connected to said rear frame to raise and lower with respect to said frame,
    a hold-down member coupled at one end to said deck and at the other end to said bottom member, said hold-down member comprising a pair of concentric elements telescoping relative to each other, spring means to bias said pair of elements into compression and thereby provide for elasticity for said dock leveler as a vehicle is loaded or unloaded, a brake shoe movable relative to one of said pair of elements, means to bias said brake shoe into engagement with one of said pair of concentric elements and release means to urge said brake shoe away from said one of said pair of elements.

12. The dock leveler of claim 11 wherein said brake shoe comprises a tapered surface and said means to bias said brake shoe into engagement comprises a mounting for said brake shoe, a roller mounted for rotation relative to said mounting, and spring means mounted on said mounting to urge said tapered surface against said roller.

13. The dock leveler of claim 11 further comprising a housing for said brake shoe, and wherein said release means comprises a lever mounted to said housing for rotational motion and means moveable by said lever to move said brake shoe whereby said brake shoe disengages from contact with one of said pair of concentric elements.

14. The dock leveler of claim 13 wherein said brake shoe has a recess therein, a pin engaging a wall forming said recess and means coupling said pin to said lever, whereby motion of said lever causes said pin to engage said wall and move said brake shoe.

15. The dock leveler of claim 13 further comprising an adjusting bolt mounted to said lever and operably engaging said housing to automatically release said brake shoe when said pair of concentric elements separate further than a predetermined distance.

16. The dock leveler of claim 12 wherein said release means comprises a lever coupled to said mounting for pivotal movement, an actuating element responsive to movement of said lever to contact an end of said brake shoe and urge it against said spring means.

17. The dock leveler of claim 11 wherein said pair of concentric elements comprise a rod and tube assembly, a flange coupled to said tube, a housing for said rod and having a boss protruding through said flange, said spring means mounted on said boss and bearing against said flange whereby said flange and said housing are biased into engagement with each other.

18. The dock leveler of claim 17 wherein said release means comprises a lever mounted to said housing, an opening in said housing and means extending in said opening and responsive to movement of said lever to disengage said brake shoe from said rod.

19. The dock leveler of claim 18 further comprising an adjustment screw mounted to said lever and said flange and contacting said housing to urge said lever to disengage said brake shoe when said housing and said flange have separated a predetermined distance.

20. The dock leveler of claim 17 further comprising a roller mounted in said housing to position said rod relative to said brake shoe.

* * * * *